(12) United States Patent
Voelker

(10) Patent No.: US 11,619,930 B2
(45) Date of Patent: Apr. 4, 2023

(54) METHOD AND APPARATUS FOR CREATING ORDERS OF INDIVIDUAL PRODUCTS

(71) Applicant: Dürkopp Fördertechnik GmbH, Bielefeld (DE)

(72) Inventor: Sigurd Voelker, Vlotho (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 404 days.

(21) Appl. No.: 16/434,980

(22) Filed: Jun. 7, 2019

(65) Prior Publication Data

US 2019/0377335 A1    Dec. 12, 2019

(30) Foreign Application Priority Data

Jun. 11, 2018  (DE) ..................... 10 2018 209 268.0

(51) Int. Cl.
| | |
|---|---|
| *G05B 19/418* | (2006.01) |
| *G06Q 10/08* | (2012.01) |
| *G05D 1/00* | (2006.01) |
| *G06Q 10/0832* | (2023.01) |

(52) U.S. Cl.
CPC ..... *G05B 19/41895* (2013.01); *G05D 1/0088* (2013.01); *G06Q 10/0832* (2013.01); *G05D 2201/0216* (2013.01)

(58) Field of Classification Search
CPC ........... G05B 19/41895; G05D 1/0088; G05D 2201/0216; G06Q 10/0832
USPC .................................................. 700/213–230
See application file for complete search history.

(56) References Cited

U.S. PATENT DOCUMENTS

| | | | | | |
|---|---|---|---|---|---|
| 3,561,619 | A | * | 2/1971 | Weir ................... | B65G 1/1378 414/281 |
| 3,785,474 | A | * | 1/1974 | Nakamoto ........... | B65G 47/487 198/355 |
| 4,237,598 | A | * | 12/1980 | Williamson ......... | B23Q 7/1426 483/4 |
| 5,025,140 | A | * | 6/1991 | Varley ................. | G06Q 10/087 235/381 |
| 5,072,822 | A | * | 12/1991 | Smith .................. | G06F 7/08 198/465.4 |
| 5,352,081 | A | * | 10/1994 | Tanaka ................. | B65G 1/1376 186/2 |
| 5,441,158 | A | * | 8/1995 | Skinner ................ | B07C 5/3412 198/370.03 |

(Continued)

FOREIGN PATENT DOCUMENTS

| | | |
|---|---|---|
| DE | 695 02 382 T2 | 2/1999 |
| DE | 10123598 A1 | 11/2002 |

(Continued)

OTHER PUBLICATIONS

Anonymous, "Fulfilment Factory—"E-Commerce made easy"" SSI Schäfer, Sep. 20, 2012.

*Primary Examiner* — Michael Collins
(74) *Attorney, Agent, or Firm* — McGlew and Tuttle, P.C.

(57) ABSTRACT

A method of creating orders of individual products comprises a conveying of at least one individual product to an unloading station by means of a respective carrying device, an unloading of the at least one individual product from the carrying device at the unloading station in an order-related manner, a transporting of the at least one individual product of an order to a packing station.

20 Claims, 2 Drawing Sheets

(56) References Cited

U.S. PATENT DOCUMENTS

| | | | | |
|---|---|---|---|---|
| 5,573,101 | A * | 11/1996 | Ouwejan | B65G 47/49 198/465.4 |
| 5,799,800 | A * | 9/1998 | Lux | B07C 3/02 209/559 |
| 5,927,472 | A * | 7/1999 | Neef | B65G 17/20 198/465.4 |
| 5,943,841 | A * | 8/1999 | Wunscher | B65G 1/1376 53/154 |
| 6,050,421 | A * | 4/2000 | Hansen | B07C 5/38 209/912 |
| 6,578,671 | B2 * | 6/2003 | Shen | G06Q 10/0875 186/35 |
| 7,245,988 | B1 * | 7/2007 | Terepka | D06F 93/00 198/349.6 |
| 7,925,376 | B2 * | 4/2011 | Lewis | B65G 1/1376 700/216 |
| 9,212,013 | B2 | 12/2015 | Fankhauser et al. | |
| 9,327,397 | B1 * | 5/2016 | Williams | B25J 3/04 |
| 9,472,044 | B2 * | 10/2016 | Odisho | G07F 7/08 |
| 9,821,960 | B2 | 11/2017 | Issing | |
| 10,450,139 | B2 * | 10/2019 | Friedl | B65G 1/045 |
| 10,800,608 | B1 * | 10/2020 | Campbell | G06Q 10/08 |
| 10,934,102 | B2 * | 3/2021 | Sigrist | B65G 1/1378 |
| 2004/0030442 | A1 * | 2/2004 | Speckhart | G07F 17/12 700/213 |
| 2004/0175038 | A1 * | 9/2004 | Bonner | G06V 10/94 382/181 |
| 2007/0293978 | A1 * | 12/2007 | Wurman | C07C 253/34 700/213 |
| 2008/0008568 | A1 * | 1/2008 | Harris | B65G 1/06 414/281 |
| 2008/0086231 | A1 * | 4/2008 | Kim | B25J 15/0491 700/215 |
| 2012/0101627 | A1 * | 4/2012 | Lert | B65G 1/065 700/216 |
| 2012/0185080 | A1 * | 7/2012 | Cyrulik | B65G 47/883 700/214 |
| 2013/0282165 | A1 * | 10/2013 | Pankratov | B65G 57/09 700/217 |
| 2014/0271063 | A1 * | 9/2014 | Lert | B65G 1/065 414/273 |
| 2014/0303770 | A1 * | 10/2014 | Wend | B65G 1/1376 700/215 |
| 2018/0297620 | A1 * | 10/2018 | Murakami | B61B 10/02 |
| 2019/0054587 | A1 * | 2/2019 | Wahrén | B65G 47/684 |
| 2019/0108604 | A1 * | 4/2019 | Friedl | B65G 1/045 |
| 2019/0291968 | A1 * | 9/2019 | Gallati | B65G 19/025 |
| 2020/0156876 | A1 * | 5/2020 | Schnadwinkel | B65G 37/02 |

FOREIGN PATENT DOCUMENTS

| | | |
|---|---|---|
| DE | 102011015138 A1 | 9/2012 |
| DE | 102011101987 A1 | 11/2012 |
| DE | 102012101198 A1 | 4/2013 |
| EP | 1 205 406 A1 | 5/2002 |
| EP | 2 789 555 A1 | 10/2014 |
| EP | 3180274 B1 | 12/2017 |
| EP | 3 453 649 A1 | 3/2019 |
| JP | 2000 289815 A | 10/2000 |
| WO | 2015/124524 A1 | 8/2015 |

* cited by examiner

METHOD AND APPARATUS FOR CREATING ORDERS OF INDIVIDUAL PRODUCTS

CROSS-REFERENCE TO RELATED APPLICATIONS

This application claims the priority of German Patent Application, Serial No. 10 2018 209 268.0, filed on Jun. 11, 2018, pursuant to 35 U.S.C. 119(a)-(d), the content of which is incorporated herein by reference in its entirety as if fully set forth herein.

FIELD OF THE INVENTION

The invention relates to a method and an apparatus for creating orders of individual products.

BACKGROUND OF THE INVENTION

In the following text, an order is to be understood as one individual product or as a plurality of individual products belonging together that form an order for e-commerce shipments. Corresponding orders relating to the sale and distribution of particular products can also be made between business partners (B2B). Contrary thereto, however, individual products such as envelopes or packages shipped by mail to an intermediate destination are not to be understood as orders.

In an overhead conveyor installation, individual products can be conveyed in carrying devices, in particular so-called transport bags in an in particular separate manner. The separate conveying of the goods allows for a targeted order picking. In order to complete an order, the transport bags are conveyor to packing stations. At the packing stations, the individual products are removed from the transport bags and packed into orders. The overhead conveyor installation may have up 100 packing stations or more. Each packing station requires a system infrastructure such as two switches, two bag conveyors and a packing station conveyor comprising a separating unit and a reading device.

SUMMARY OF THE INVENTION

It is the object of the present invention to simplify the infrastructure of the overhead conveyor installation, in particular in the region of the packing stations, in particular to reduce the complexity of the infrastructure and in particular the space required for the packing stations.

According to the invention, this object is achieved by a method of creating orders of individual products, the method comprising the methods steps of conveying at least one individual product to an unloading station by means of a respective carrying device, unloading the at least one individual product from the carrying device at the unloading station in an order-related manner, and transporting the at least one individual product of an order to a packing station.

In another aspect of the invention, this object is achieved by an apparatus for creating orders of individual products, the apparatus comprising at least one carrying device to convey an individual product along a conveyor installation in a separate manner, an unloading station connected to the conveyor installation to unload the at least one individual product of an order in an automated manner, and a transport infrastructure to transport the at least one individual product after unloading.

According to the invention, it was found that the infrastructure of an overhead conveyor installation, in particular in the region of packing stations, can be reduced by performing an unloading of carrying devices at an unloading station, in other words separately from packing stations. An unloading at the packing stations is omitted, in other words it no longer takes place. The complexity of the infrastructure at the packing stations is reduced. The investment costs and in particular a space requirement and in particular a height requirement in the region of the packing stations are reduced. Unloading is in particular carried out in an automated manner. The individual products of an order are loaded into loading stations, in particular in transport containers configured to feed the individual products of an order to a packing area with at least one packing station. In particular, at least one unloading station is provided. In particular, at least one packing station is provided. In particular, there is no permanent assignment and no permanent relation between the at least one unloading station and the at least one packing station. The at least one packing station is in particular independent of the at least one unloading station.

Preferably, a transport container is used for transportation. A transportation without transport container is also conceivable. For example, a transport infrastructure is provided, which is suitable for direct transportation of the individual products, such as a conveyor, in particular a belt conveyor, by means of which the individual products can be transported directly and without transport container.

If the individual products of an order exceed the transport volume of the transport container, it is also possible to use more than one transport container. To increase the unloading capacity of the overhead conveyor installation, it is conceivable to provide a plurality of unloading stations, which are in particular each assigned to a respective sorting unit. For example, between three and five or even more unloading stations can be provided. As the individual products are unloaded at the unloading stations, the infrastructure at the packing stations can be omitted. Unloading takes place in a centralized manner.

At the packing stations, the individual products of the order are in particular packed such as to be ready for shipment. In the simplest case, the packing station can be configured as a packing table to which the unloaded individual products are transported from the unloading station. An essential aspect of the invention is that it is not necessary for the carrying devices to be discharged at every single packing station in order to be collected there in an order-related manner. The packing stations are decoupled from the carrying devices of the overhead conveyor installation. In addition to or as an alternative to the packing process performed at the packing station, the individual products can also be prepared for shipment at the packing station, for example by closing a shipping container, in particular a shipping box, and/or attaching an in particular adhesive shipping label. Additionally or alternatively, it is also possible to perform so-called value added services at the packing station. Value added services of this type include for example the assembly, repair, handling of returned goods, quality inspection and/or shipment tracking of individual products.

It was found that with a reduced throughput of for example 250 individual products per hour in a conventional packing station setup configured such that the individual products are unloaded directly at the packing station, the conveyor infrastructure at a packing station of the overhead conveyor installation, which requires an in particular manual unloading, does not operate at full capacity because this packing capacity is smaller and in particular much smaller than a delivery capacity, in other words the throughput rate of individual products transported and/or conveyed through the installation. As the individual products can be unloaded automatically at a capacity, which is higher, in particular much higher, than the maximum packing capacity, a significant part of the overhead conveyor system required at the packing stations can be omitted, with said overhead conveyor system being replaced by a very simple transportation system, in particular tray conveyors, automated transportation systems and/or manual transportation vehicles. The accessibility of the packing station is improved. In particular, this allows further individual products to be fed and added, which are not transported in the carrying devices because of their size, fragility, value, geometry, in particular sharp edges, or other properties. Individual products of this type are referred to as products not suitable for transport in a transport bag. Compared to prior art technology, said adding of individual products is simplified. In particular, in prior art technology, individual products must be added at the same frequency as that used for unloading the individual products at the unloading station. This elaborate synchronization is not necessary in the present method. Furthermore, the adding of individual products is simplified by the reduction of the overhead conveyor system, with the result that the accessibility of the packing station is improved.

An expansion of the packing areas, in particular the number of the packing stations, can be changed easily, for example depending on the time of year. At the unloading station, the individual products are loaded from a transport bag of one or a plurality of carrying devices into one or a plurality of transport containers. An order picking at the unloading station is no longer necessary. An order picking at the packing station is no longer necessary as the individual products of an order are pre-picked, in particular in the transport container, and ready for packing when arriving at the packing station. The method of unloading the individual products from the carrying devices at the unloading stations can be carried out manually or in an automated, in particular fully automated manner.

The method according to the invention and the apparatus according to the invention allow a fully automatic "product-to-man system". The in particular automated unloading allows the carrying devices to be opened dynamically. As it is not necessary to collect the individual products at the packing station, an elaborate buffer area for carrying devices at the packing station for temporarily buffering the accumulated products can be omitted. The number of packing stations in an apparatus of this type can easily be varied as no overhead conveyor systems are required at the packing stations. The complexity of the entire infrastructure and technical equipment is reduced. An order typically comprises a plurality of individual products. However, it is also conceivable for an order to consist of only one single individual product.

According to the invention, it was also found that the conveyor installation for individual products on the one hand and the transport infrastructure for collected orders on the other can be configured differently. The aim of the conveyor installation is to convey the individual products to the unloading station in a separated and in particular sorted manner. It is advantageous if the time interval between the first individual product of an order and the last individual product of an order at the loading station is as small as possible, causing the dwell time of a transport container at the unloading station to be reduced and in particular minimized. The transport container will rapidly be available for new orders. Accordingly, the unloading station will also be rapidly available again as the unloading station is blocked as long as the transport container is arranged below it. The faster the transport container is removed, the less time it takes to prepare the unloading station for new orders. The capacity of the entire installation is increased.

The aim of the transport infrastructure is to transport the individual products of an order from the unloading station to the packing stations in a collected and order-related manner. For this purpose, it is conceivable for a plurality of individual products of an order to be arranged in one transport container. An individual assignment of the individual products, in particular a separation of the individual products along the transport path from the unloading station to the packing stations is not necessary. The transport infrastructure can be designed in a comparatively simple and rugged manner. It is advantageous if the transport infrastructure is configured to transport a transport container into which the individual products have been unloaded in the unloading station. The transport infrastructure can however also be designed without transport container in such a way that the individual products of an order are loaded directly onto a transportation vehicle or a conveyor belt.

Furthermore it was found that by separating the unloading process from the packing process, a flexible design of the overhead conveyor installation, in particular of the arrangement of the packing stations in the packing area, and in particular of the entire packing area, can be achieved. The layout of the packing area comprising the packing stations is in particular independent of the conveyor system of the overhead conveyor installation, in other words of the overhead conveyor system. The arrangement and/or the number of packing stations can be adapted to varying requirements to be met by the overhead conveyor installation flexibly and in particular rapidly. Varying requirements may occur in particular when handling individual products for e-commerce shipments. An already existing overhead conveyor installation, in particular the packing area thereof, can be retrofitted flexibly to meet varying requirements. In particular, changing the layout of the packing area does not require changes in the way the process is being carried out.

In particular, it is possible for the carrying devices to be unloaded at the unloading stations while the carrying devices are being transported along a transport direction. For this purpose, an unloading corridor can be defined in particular in the unloading station in which the automatic unloading of the carrying devices takes place. The length of the unloading corridor depends in particular on the transport speed of the carrying devices and/or on the size of the transport container.

A method configured such that the sequence of the individual products is changed before they are conveyed to the unloading station, with the individual products in particular being sorted in an order-related manner, simplifies the order-related unloading of the carrying devices. It is advantageous if the interval during which the individual parts of an order arrive at the unloading station is reduced. Changing the sequence in particular aims at minimizing said interval. It is particularly advantageous if the individual products of an order are delivered to the unloading station in one sequence, in other words without any other individual products belonging to a different order being arranged therebetween. It is advantageous if the individual products of an order are delivered together.

A method configured such that each transport container contains only individual products of one order simplifies the packing process in such a way that the individual products of the transport container can be combined in one order without requiring an additional verification step. It is conceivable for the individual products of an order to be split among a plurality of transport containers, in particular because of a lack of space. In this case, the transport containers with the individual products of one order are transported to one and the same packing station.

A method configured such that each transport container contains all individual products of one order allows the packing process to be made even simpler as all individual products from the transport container are packed into an order, which is ready for shipment.

A method configured such that unloading takes place by an opening of the carrying device ensures simpler unloading of the individual products. The carrying devices are opened, in particular in a bottom area, causing the individual products to fall out in particular due to gravity. A separate handling of the carrying bags, in particular rotating or pivoting the carrying device into a position such that the individual products are able to fall out through the loading opening or can be removed through the loading opening is not required. The complexity of the installation, in particular for the infrastructure at the unloading station, is reduced. As the unloading process at the unloading station takes place in an automated manner, the number of operators required and the expenditures for the transport infrastructure are reduced additionally.

A method configured such that for automated unloading, the carrying device is opened in an automated manner, causing the individual product to be unloaded from the carrying device automatically, in particular due to gravity, simplifies the automated unloading of the carrying devices. As the individual products are removed from the carrying device in an automated and in particular automatic manner, in particular due to gravity, the unloading process can be carried out rapidly, easily and without errors.

An apparatus configured such that the unloading station has an opening unit to open the at least one carrying device in an automated manner ensures the advantageous automated opening of the carrying devices, in particular at a high throughput rate.

A transport infrastructure configured such that the transport infrastructure has an autonomous vehicle simplifies the decoupling of the transport bags from the packing stations. An autonomous vehicle used in particular for transporting the transport container with the individual products of an order from the unloading station to the packing station is particularly advantageous. An autonomous vehicle is also referred to as automatic guided vehicle (AGV).

The transport infrastructure may additionally or alternatively comprise a container conveyor, in particular a belt conveyor on which the transport container is placed, and/or a trolley, which is transported manually from the unloading station to the packing station.

The actual design of the transport infrastructure in practical application is not important as long as a reliable transport connection between the unloading station and the packing station is guaranteed to ensure a reliable and independent transport of the transport containers filled in particular with the individual products of an order. In particular, a transport infrastructure, which does not require transport containers, is conceivable as well. For example, it is conceivable for the transport infrastructure to be configured as a conveyor belt, which may have zones separated by webs.

An apparatus comprising a sorting unit to sort the carrying devices in an order-related manner ensures that the carrying devices are conveyed to the unloading station in a sorted and order-related manner. The actual sequence of the individual products of an order is not important. What is important is that all individual products of an order are conveyed to the unloading station one behind the other, in particular without any other individual products of another order being arranged therebetween. It may be advantageous to sort the individual products of a particular order in such a way that large and/or heavy individual products are conveyed into the unloading station first. This may prevent damages to the individual products and/or their packagings caused by the automatic unloading of the carrying devices due to gravity.

Further advantages, additional features and details of the invention will emerge from the ensuing description of an exemplary embodiment, taken in conjunction with the drawing.

DESCRIPTION OF THE PREFERRED EMBODIMENT

Figure 1:
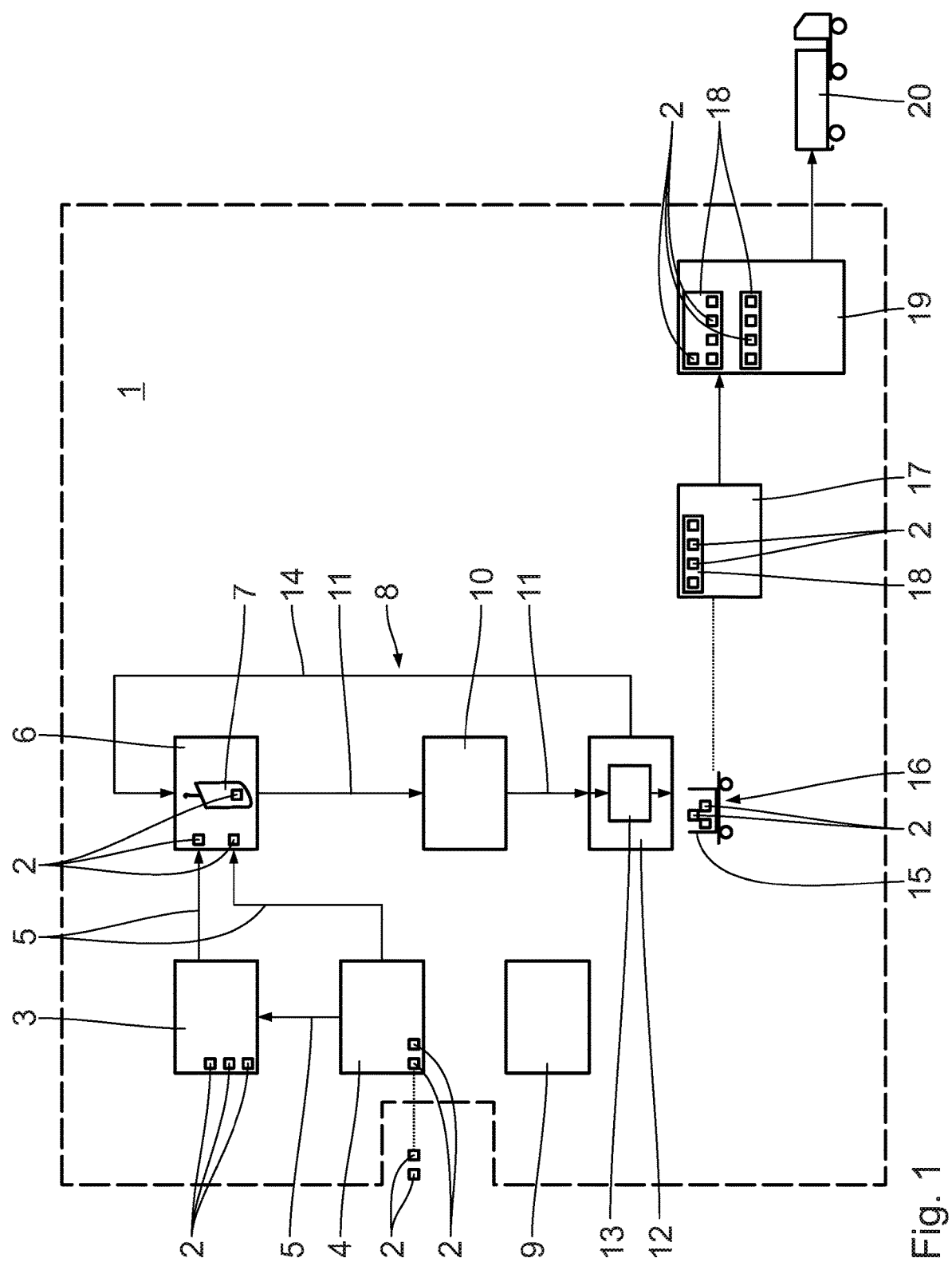
FIG. 1 shows a schematic view of the apparatus according to the invention.

An apparatus, designated as a whole by reference numeral 1 in FIG. 1, is used for conveying and/or transporting individual products 2. The apparatus 1 comprises a warehouse 3 in which the individual products 2 are stored. The warehouse 3 can be configured as a manual warehouse or as an automatic warehouse. The apparatus 1 further includes an incoming goods department 4 via which the individual products 2 can be supplied to the apparatus, in particular from outside. Returned goods can also be supplied to the incoming goods department.

The incoming goods department 4 is connected to the warehouse 3 by means of a conveyor system 5. The conveyor system 5 is for example a conveyor belt or a manual feeding of the individual products 2 to the warehouse 3, it in particular being possible for the products to be provided to the incoming goods department 4 in the form of bundles.

The installation 1 further comprises a loading station 6 where the individual products are loaded into a carrying device 7 configured as a transport bag. By means of a conveyor system 5, the loading station 6 is connected both to the incoming goods department 4 and to the warehouse 3 separately. By means of the conveyor system 5, the individual products 2 are conveyor from the warehouse 3 and/or the incoming goods department 4 to the loading station.

An installation 1 without conveyor system between the loading station 6 and the incoming goods department 4 and/or the warehouse 3 is also conceivable. In this case, the individual products 2 are transported from the incoming goods department 4 and/or the warehouse 3 to the loading station 6 manually, in particular using spring loaded trolleys or pallet lifting trucks.

It is advantageous to provide each of the carrying devices 7 with a respective identification device allowing them to be identified unambiguously. It is particularly preferred if the carrying device 7 is displaceable in a rail system of an overhead conveyor installation 8 in a guided manner using a roll adapter, the roll adapter in particular having an integrated RFID chip, which may be used for storing the identification data.

The carrying devices 7 can be conveyed along the overhead conveyor installation 8 in a suspended manner. For this purpose, the carrying devices 7 each have a hook, which is adapted to engage a corresponding recess of the roll adapter. The recess of the roll adapter is also adapted to accommodate a clothes hanger with a piece of clothing hanging thereon. In particular, each carrying device 7 serves for transporting precisely one individual product 2.

In particular, the individual products 2 each have an individual product identification device allowing the individual products 2 to be identified unambiguously, for example clothing according to manufacturer, item, size, color, etc. The identification data of the carrying device 7 and of the individual product 2, which have been detected by means of the identification device and transmitted to a central control unit 9 via a signal connection, are linked with each other in the control unit 9.

When being transported in the overhead conveyor installation 8, individual products 2 can be assigned unambiguously by reading units arranged correspondingly along the overhead conveyor installation 8, the reading units detecting in particular the position of the carrying devices 7, thus allowing the individual products to be conveyed along the overhead conveyor installation 8 in a separated and targeted manner.

The overhead conveyor installation 8 comprises a sorting unit 10 configured to sort the carrying devices 7, in other words to change the sequence of the individual products 2 in the product flow. The sorting unit 10 can be designed in various ways. The sorting unit can have a plurality of accumulation paths arranged in parallel and/or in series and/or one or a plurality of carousels. Additionally or alternatively, the sorting unit can be configured as a matrix sorter. What is important is that the sequence of the goods 2 in the product flow can be changed in a targeted manner.

The overhead conveyor installation 8 comprises a rail system 11 by means of which the carrying devices 7 can be conveyed from the loading station 6 to the sorting unit 10 and through the sorting unit 10. The rail system 11 also serves to connect the sorting unit 10 to at least one unloading station 12 in a conveying manner A plurality of, in particular three or five, unloading stations 12 can be provided for each sorting unit 10. In particular, each unloading station 12 connected to the sorting unit is accessible from each carousel of the sorting unit. It is in particular not necessary for the individual products of the orders to be collected in separate carousels and/or storage tracks. The individual products of an order can be distributed randomly in a sorting unit connected thereto in a conveying manner. The unloading stations 12 are assigned to the sorting unit 10. In the unloading station 12, the carrying devices 7 loaded with in each case one individual product 2 are opened and unloaded in an automated manner. An opening unit 13 is provided to open the carrying devices 7 in the unloading station 12 in an automated manner.

Having been emptied in the unloading station 12, the carrying devices 7 are returned via a return path 14 of the overhead conveyor installation 8, are closed by means of a closing unit not shown, in other words they are restored to their original condition, and are moved back to the loading station, for example, to be loaded with individual products 2 again. The emptied carrying devices 7 can also be stored temporarily in an empty bag storage, which is not shown.

Having been unloaded in the unloading station, the individual products 2 are collected in a transport container 15 in an order-related manner. The transport container 15 interacts with a transport infrastructure 16. The transport infrastructure 16 connects the unloading station 12 to a packing station 17. According to the exemplary embodiment shown, the transport infrastructure 16 is configured as an autonomous vehicle to transport the transport container 16 filled with individual products 2 to the packing station 17. Other embodiments of the transport infrastructure 16 are also conceivable, such as a rail-driven trolley, a belt conveyor and/or a manually driven trolley. The unloading station 12 is coupled with the packing station 17 by means of the transport infrastructure 16. In particular, the packing station 17 is decoupled from the overhead conveyor installation 8 and the carrying devices 7.

The transport container 15 is adapted to accommodate a plurality of individual products 2 and to transport them from the unloading station 12 to the packing station 17.

In the packing station 17, the individual products are packed into an order 18 ready for shipment.

The packing station 17 is connected to an outgoing goods department 19 in a conveying manner Via the outgoing goods department 19, the orders 18 comprising the individual products 2 are able to leave the installation 1.

The orders 18 processed in the installation 1 may comprise various products and various numbers of products. It is conceivable as well for an order 18 to comprise only one single individual product 2. Orders 18 from the outgoing goods department 19 can be shipped using external transportation means 20 such as trucks.

Figure 2:
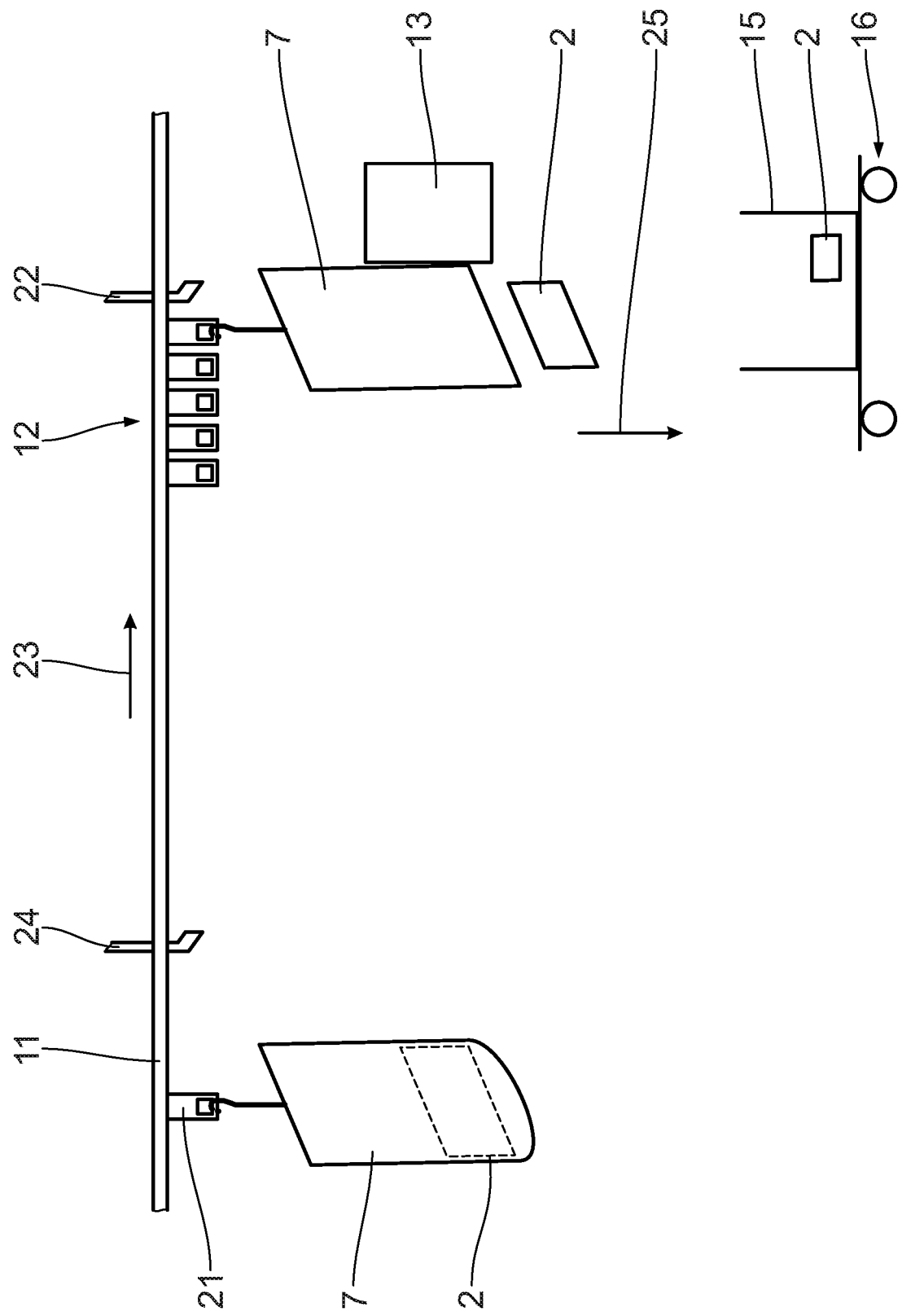
FIG. 2 shows a schematic side view of an unloading station of the apparatus as shown in FIG. 1.

The unloading station 12 will hereinafter be explained in more detail, taken in conjunction with FIG. 2.

The carrying devices 7, which are suspended from the roll adapters 21 when being conveyed along the rail system 11 of the overhead conveyor installation 8, are transported to the unloading station 12.

In the region of the opening unit 13, a stop device 22 is provided, which allows the carrying devices 7, in particular the roll adapters 21, to be stopped, thus reliably preventing the carrying devices 7 from being conveyed past the stop device 22 in the transport direction 23. According to the exemplary embodiment shown, the stop device 22 is configured as a stop member, which is displaceable in a direction transverse and in particular perpendicular to the transport direction 23 in relation to the rail system 11.

According to the exemplary embodiment shown, there are five carrying devices 7 in the unloading station 12, the drawing primarily showing the respective roll adapters 21 thereof for the sake of clarity.

Seen upstream in the transport direction 23, a feed stop 24 is provided at the unloading station 12. The feed stop 24 is substantially identical to the stop device 22 in the unloading station 12. The feed stop 24 prevents roll adapters 21 with carrying devices 7 provided thereon from inadvertently being fed into the unloading station 12. The feed stop 24 can also be omitted.

The opening unit 13 is arranged in the unloading station 12 in the region of the carrying devices 7 arranged in particular at the front when seen along the transport direction 23. When the carrying devices 7 have been accumulated in the unloading station 12 by means of the activated stop device 22, the carrying device 7, which is thus prevented from any further movement, can be unloaded by means of the opening unit 13. It is also conceivable for the stop device 22 to be omitted. It is also conceivable for the carrying devices to be opened by means of the opening unit 13 while they are being transported along the transport direction 23. In this case, the individual products are being unloaded while the carrying devices 7 are being moved.

In particular, the carrying device 7 has an opening mechanism at a lower end, said opening mechanism allowing the carrying device 7 to be opened automatically. A carrying device 7 of this type configured as a transport bag is the subject matter of German Patent application No. 10 2018 201 675.5 of the applicant. Details concerning the design and function of a transport bag of this type and in particular the automatic opening of the carrying device can be found in DE 10 2018 201 675.5.

The stop device 22 defines the unloading position in the unloading station 12. The opening unit 13 is arranged in the region of the unloading position.

The stop device 22 can also be omitted. In this case, the unloading position is configured as an unloading area, which is in particular defined by an unloading corridor. The unloading corridor is defined along the transport direction 23 and has an unloading starting point and an unloading end point arranged downstream thereof in the transport direction 23. In particular, the unloading corridor is defined such that individual products falling out of the carrying device automatically due to gravity fall into the transport container 15 arranged in the receiving position, in other words they are unloaded. The distance between the unloading starting point and the unloading end point along the transport direction 23 in particular depends on the transport speed of the carrying devices 7.

The unloading area, and therefore the unloading starting point and the unloading end point, are arranged in the unloading station 12. In the unloading area, the bag is opened. The unloading area in particular has a variable design and is subject to deviations. The unloading area depends on the transport speed of the carrying device 7, a reciprocating movement of the carrying device 7 along and/or transverse to the transport direction and/or the discharge direction along which the individual product is discharged into the carrying device 7. The vertical distance between the carrying device 7 and the transport infrastructure is another factor that must be considered.

The transport container 15 is also arranged in the unloading station 12 in the region of the unloading position to accommodate the unloaded individual products 2. In particular, the transport container 15 is arranged below the carrying device 7, which is in the unloading position at that particular instant. The individual products 2 are able to fall out of the carrying device 7, which is open in particular in its lower region, automatically, in particular due to gravity, causing them to fall directly into the transport container 15. Unloading takes place along the unloading direction 25. It is also conceivable to provide additional sliding aids to ensure a guided and/or targeted movement of the individual product 2 from the emptied carrying device 7 into the transport container 15.

The transport container 15 is arranged on the autonomous vehicle and forms part of the transport infrastructure 16. Additionally or alternatively, a belt conveyor or another transportation means can be provided as transport infrastructure 16.

Depending on the number of individual products, a plurality of transport containers 15 may be required to transport all individual products 2 of an order 8 to the packing station 19. In particular, the individual products 2 of an order 8 are transported to the packing station collectively in an order-related manner

What is claimed is:

1. A method of creating orders of individual products, the method comprising the methods steps of:
    conveying individual products separately along an overhead conveyor installation in a suspended manner using roll adapters, the roll adapters being conveyed along a rail system of the overhead conveyor installation to an unloading station, wherein each of the roll adapters comprises a recess for accommodating at least one of a carrying device and a clothes hanger, wherein the individual products are at least one of arranged within the carrying device and hung on the clothes hanger;
    unloading at least one of the individual products at the unloading station, the at least one of the individual products relating to a specific order, wherein unloading takes place by at least one of opening of the carrying device and unhanging the clothes hanger from corresponding roll adapters;
    transporting the at least one of the individual products of the order from the unloading station to a packing station using a transport infrastructure, the transport infrastructure connecting the unloading station with the packing station in a transporting manner, wherein the transport infrastructure comprises at least one transport container, the at least one transport container containing at least one of only individual products of one order and all individual products of one order;
    at the packing station packing the individual products of the order as to be ready for shipment.

2. The method as claimed in claim 1, wherein the sequence of the individual products is changed before the individual products are conveyed to the unloading station, wherein the transport infrastructure has a different structure from the overhead conveyer installation.

3. The method as claimed in claim 2, wherein the individual products are sorted in an order-related manner.

4. The method as claimed in claim 1, wherein for automated unloading, the carrying device is opened in an automated manner, causing the individual product to be unloaded from the carrying device automatically.

5. The method as claimed in claim 4, wherein the individual products are unloaded from the carrying device due to gravity.

6. The method as claimed in claim 1, wherein the carrying device is configured as a transport bag.

7. The method as claimed in claim 6, wherein the at least one of the individual products is unloaded by emptying the transport bag.

8. The method as claimed in claim 1, wherein the at least one of the individual products is unloaded by withdrawing the clothes hanger with a piece of clothing hanging thereon from the roll adapter.

9. An apparatus for creating orders of individual products, the apparatus comprising:
    an overhead conveyor installation with a rail system and roll adapters being conveyable along the rail system, wherein each of the roll adapters comprises a recess for accommodating at least one of a carrying device and a clothes hanger, each carrying device and each clothes hanger being configured to convey an individual product in a separate manner along the conveyor installation;
    an unloading station connected to the conveyor installation to unload the at least one individual product relating to a specific order in an order-related manner, wherein unloading the at least one individual product takes place at the unloading station by at least one of opening of the carrying device and unhanging the clothes hanger from one of the roll adapters;
    a transport infrastructure configured to transport the at least one individual product from the unloading station to at least one packing station after unloading the at least one individual product at the unloading station, wherein the transport infrastructure connects the unloading station with the at least one packing station in a transporting manner, wherein the transport infrastructure comprises at least one transport container, the at least one transport container containing at least one of only individual products of one order and all individual products of one order, wherein the individual products of the order are packed at the packing station to be ready for shipment, wherein the transport infrastructure connecting the unloading station with the packing station is different from the overhead conveyer installation for feeding the individual products to the unloading station.

10. The apparatus as claimed in claim 9, wherein the unloading station has an opening unit to open the at least one carrying device in an automated manner.

11. The apparatus as claimed in claim 9, wherein the transport infrastructure has an autonomous vehicle, the autonomous vehicle being located at a spaced location from the overhead conveyor installation.

12. The apparatus as claimed in claim 9, further comprising a sorting unit to sort the carrying devices in an order-related manner.

13. The apparatus as claimed in claim 9, wherein the carrying device is configured as a transport bag.

14. The apparatus as claimed in claim 9, wherein the at least one transport container comprises a transport container interior space configured to receive one or more of the individual products, wherein the transport container is connected to a plurality of wheels, the at least one transport container being configured to travel between the unloading station and the at least one packing station via at least the plurality of wheels.

15. The apparatus as claimed in claim 9, wherein the at least one transport container is configured to move the at least one individual product along a transportation path extending from a position underneath the unloading station to a position at the at least one packing station, the overhead conveyor installation being configured to move the at least one individual product along a conveying path, the unloading station being located along the conveying path, wherein the conveying path is different from the transportation path.

16. An apparatus for creating orders of individual products, the apparatus comprising:
an overhead conveyor installation comprising a rail system and a plurality of roll adapters, each of the roll adapters being configured to support a separate individual product suspended therefrom via one of a carrying device and a clothes hanger, wherein each of the roll adapters is further configured to move along the rail system with the separate individual product suspended therefrom;
an unloading station connected to the conveyor installation, the unloading station being configured to unload the separate individual product relating to a specific order in an order-related manner, wherein unloading of the separate individual product takes place at the unloading station by at least one of opening of the carrying device and unhanging the clothes hanger from one of the roll adapters;
a transport infrastructure configured to transport the separate individual product from the unloading station to at least one packing station after unloading the separate individual product at the unloading station, wherein the transport infrastructure connects the unloading station with the at least one packing station in a transporting manner, wherein the transport infrastructure comprises at least one transport container, the at least one transport container containing at least one of only individual products of one order and all individual products of one order, wherein the individual products of the order are configured to be packed at the at least one packing station such that the individual products of the order are ready for shipment, wherein the transport infrastructure connecting the unloading station with the packing station is different from the overhead conveyer installation for feeding the individual products to the unloading station.

17. The apparatus as claimed in claim 16, wherein each of the roll adapters comprises a recess for accommodating at least one of the carrying device and the clothes hanger, the separate individual product being at least one of arranged within the carrying device and hung on the clothes hanger.

18. The apparatus as claimed in claim 17, wherein the unloading station has an opening unit to open the at least one carrying device in an automated manner.

19. The apparatus as claimed in claim 18, wherein the transport infrastructure has an autonomous vehicle, the autonomous vehicle operating independent of the overhead conveyor installation, the autonomous vehicle comprising a plurality of wheels.

20. The apparatus as claimed in claim 16, wherein the at least one transport container comprises a transport container interior space configured to receive one or more of the individual products, wherein the transport container is connected to a plurality of wheels, the at least one transport container being configured to travel between the unloading station and the at least one packing station via at least the plurality of wheels.

* * * * *